United States Patent
Bussey et al.

(10) Patent No.: US 8,319,792 B2
(45) Date of Patent: Nov. 27, 2012

(54) VIRTUAL COMPONENTS FOR CAD MODELS

(75) Inventors: Matthew James Bussey, Sherwood, OR (US); Hans Walter Herzog, Oakland, MI (US)

(73) Assignee: Autodesk, Inc., San Rafael, CA (US)

( * ) Notice: Subject to any disclaimer, the term of this patent is extended or adjusted under 35 U.S.C. 154(b) by 719 days.

(21) Appl. No.: 11/608,133

(22) Filed: Dec. 7, 2006

(65) Prior Publication Data

US 2008/0140357 A1 Jun. 12, 2008

(51) Int. Cl.
*G09G 5/00* (2006.01)
*G06F 19/00* (2011.01)

(52) U.S. Cl. ............ 345/619; 700/97; 700/98; 700/107; 345/419

(58) Field of Classification Search .................. 700/97, 700/98, 107; 715/964; 345/619, 418
See application file for complete search history.

(56) References Cited

U.S. PATENT DOCUMENTS

| | | | |
|---|---|---|---|
| 7,302,443 B2* | 11/2007 | Nakajima et al. | 707/102 |
| 2004/0046776 A1* | 3/2004 | Phillips et al. | 345/700 |
| 2004/0049306 A1* | 3/2004 | Shimizu | 700/96 |
| 2006/0277005 A1* | 12/2006 | Walker et al. | 703/1 |

OTHER PUBLICATIONS

3D Home Architect v.4, 2001, p. 10, 11, 13, 18, 60, 121, 190-196, 248, 249.*
3D Home Architect v.4, 2001, p. 225-228.*

* cited by examiner

*Primary Examiner* — Michelle L Sams
(74) *Attorney, Agent, or Firm* — Patterson & Sheridan, LLP (57) ABSTRACT

One embodiment of the invention is a method for composing a computer-aided design (CAD) drawing that includes modeled components and non-modeled components. The method includes receiving a selection of properties for a non-modeled component to include in the CAD drawing, where the non-modeled component defines an element of an object modeled in the CAD drawing that is not included in a display representation of the object including an instance of the non-modeled component in the CAD drawing. Although not shown in display representations, the non-modeled elements may be displayed in a browse view showing the elements included in a CAD drawing, and in a bill of materials generated from the CAD drawing.

20 Claims, 7 Drawing Sheets

VIRTUAL COMPONENTS FOR CAD MODELS

CROSS-REFERENCE TO RELATED APPLICATIONS

This application claims benefit of U.S. provisional patent application Ser. No. 60/785,970, filed Mar. 23, 2006, and U.S. provisional patent application Ser. No. 60/785,862, filed Mar. 23, 2006, both of which are herein incorporated by reference.

BACKGROUND OF THE INVENTION

1. Field of the Invention

The present invention generally relates to computer software. More specifically, the present invention relates to techniques for creating and using virtual components in a computer-aided design (CAD) drawing.

2. Description of the Related Art

The term computer-aided design (CAD) generally refers to a broad variety of computer-based tools used by architects, engineers, and other construction and design professionals. CAD software is frequently used to compose CAD drawings that include two-dimensional (2D) and/or three-dimensional (3D) models of a mechanical design. Further, the parts included in the 3D model may be used to generate a bill of materials (BOM) for part procurement or cost analysis of a proposed design. Generally, a BOM includes an entry to represent every part included in a 3D model of a mechanical design.

Even with the use of CAD software, the task of creating, manipulating, and rendering a 3D model of a mechanical design is complex. Also, mechanical designs frequently include standard parts that are not relevant to the design process. For example, parts such as wiring, inserts, fasteners, paint, and lubricants and the like are not typically included in a 3D model. Because modeling these parts is time-consuming and unnecessary, they are usually not included in the 3D model. However, because many standard parts are not typically included in the 3D model, they are omitted from a BOM generated from the 3D model. Nevertheless, since the cost of these parts must be captured, there is usually a requirement for non-modeled parts to be included in the BOM.

In the prior art, one approach to capturing the non-modeled parts has been for a designer to manually add these parts to the BOM after it has been created from the 3D model. However, since parts are not added to the BOM contemporaneously to the modeling process, this approach can result in parts being overlooked, and can result in incomplete or erroneous BOMs. Another approach in the prior art has been to create separate files containing only the parts that are not in the 3D model, and to merge these files with the 3D model files when both are complete. However, this ad-hoc approach results in a complex system of multiple files which can be difficult to manage and maintain. Furthermore, neither of these approaches accounts for the fact that although some elements of a mechanical design should not be included in a display or visual representation of the object being designed, they are part of the object being represented by the 3D model.

As the foregoing illustrates, there is a need in the art for techniques for creating and using virtual components in a CAD drawing.

SUMMARY OF THE INVENTION

The present invention generally allow non-modeled or "virtual components" to be included in a (CAD) drawings. More specifically, embodiments of the invention include a method for generating a CAD drawing that includes modeled components and non-modeled components. The method generally includes receiving a selection of properties for a non-modeled component to include in the CAD drawing, where the non-modeled component defines an element of an object modeled in the CAD drawing that is not included in a display representation of the object. Once defined, the method also includes adding an instance of the non-modeled component to the CAD drawing. Although not shown in 2D and/or 3D display representations of the object being modeled, the non-modeled elements may be displayed in a browse view showing the elements included in a CAD drawing, and in a bill of materials generated from the CAD drawing.

Advantageously, the use of virtual components in a CAD drawing both simplifies the appearance of 2D and 3D models, while simultaneously allowing these models to be used to generate an accurate BOM or parts list. By defining a non-modeled element as a virtual component, that element may be included in the CAD drawing, but not shown in display representations. Further, an associative virtual component may be associated with modeling elements that are shown in 2D or 3D representation of the CAD drawing. When such a modeling element is included in the CAD drawing, any associative virtual components associated with that modeling element are automatically included in the model. Thus, virtual components may simplify the modeling process, while at the same time, a 2D or 3D model or display representation generated from the CAD drawing may more accurately portray the object or mechanical design being modeled.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide techniques for creating and using virtual components in a 3D model composed using a CAD application. A virtual component may be included in a 3D model, but need not be displayed in views generated from the 3D model. In one embodiment, a model browser window of a CAD application allows users to add virtual components to a 3D model. Typically, virtual components represent elements of a mechanical design that are part of the object being modeled that do not need to be displayed in a rendering of the 3D model. Since virtual components are not displayed in rendered views, there is no need to define, maintain, and manage 3D images of the virtual components included in the 3D model. Thus, views of a 3D model are less cluttered with elements that are not relevant to the design process. At the same time, since the virtual components are part of the 3D model, elements represented by virtual components are included in parts lists and BOMs generated from the 3D model.

Additionally, virtual components may be associated with other elements in a 3D model that are displayed. Such virtual components are referred to herein as associative virtual components. If a component in a 3D model is moved or copied, any associative virtual components associated with that part are moved or copied as well. Thus, when a part is copied in a 3D model, the use of associative virtual components can eliminate repetitive entry of part information. For example, a common component of an integrated circuit (IC) is the pin connections used to connect the IC to a PCA board. Individually modeling these connections would be wasteful. However, by defining an IC to be associated with a number of pin connections that are defined as virtual components, these elements may automatically be included in a 3D model. Further, modeled elements having associative virtual components may be predefined and stored in a parts catalog. A designer may then include one of the predefined parts in a 3D model without having to specify a collection of associative virtual components for that part, resulting in greater efficiency.

Figure 1:
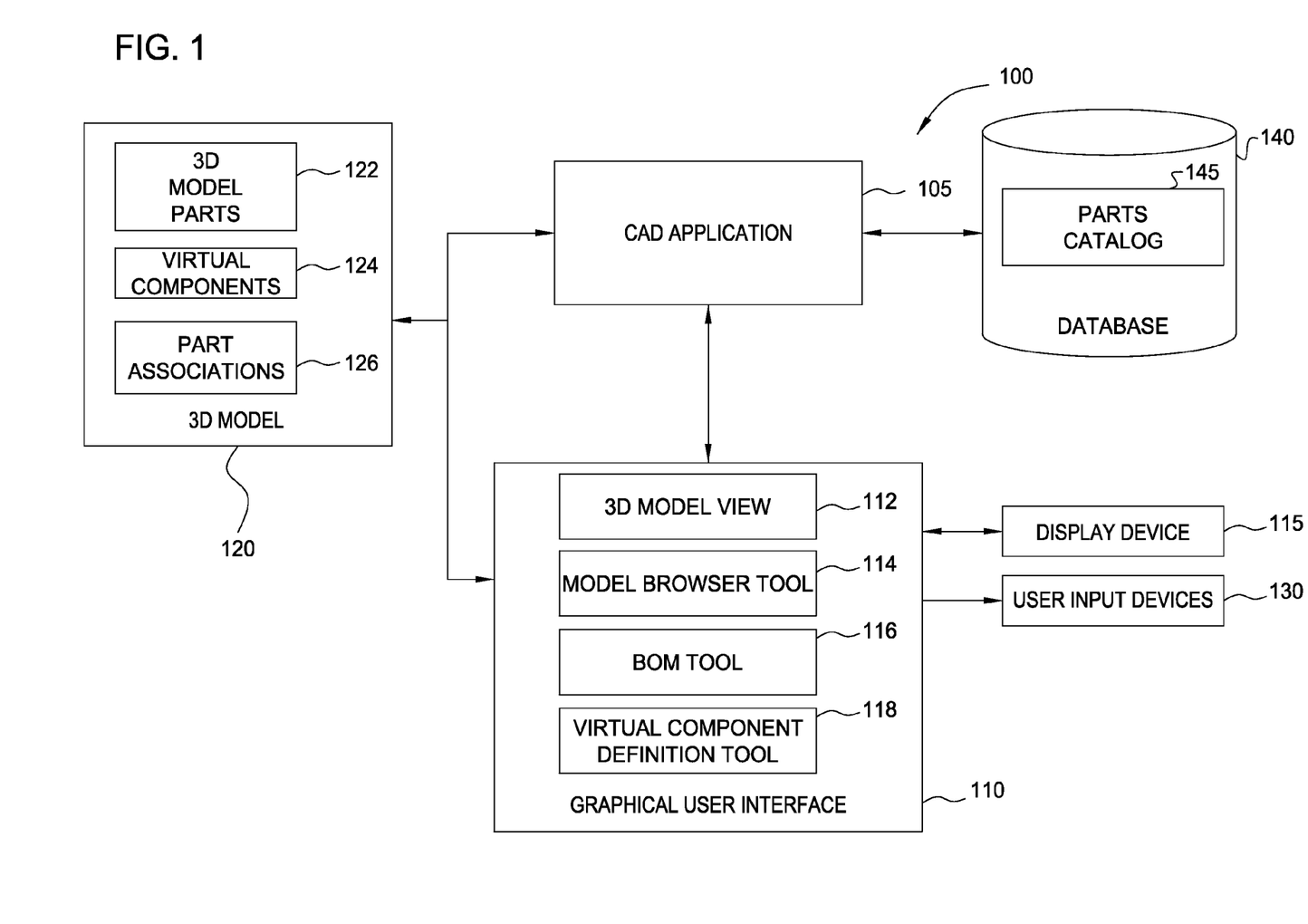
FIG. 1 is a block diagram illustrating components of a CAD application enabling the use of virtual components, according to one embodiment of the invention.

FIG. 1 is a block diagram illustrating components of a CAD system 100 used to generate a 3D model for a mechanical design, according to one embodiment of the invention. The components illustrated in system 100 are included to be representative of computer software applications executing on existing computer systems, e.g., desktop computers, server computers, laptop computers, tablet computers, and the like. The software applications described herein, however, are not limited to any particular computing system and may be adapted to take advantage of new computing systems as they become available.

Additionally, the components illustrated in system 100 may be implemented as software applications that execute on a single computer system or on distributed systems communicating over computer networks such as local area networks or large, wide area networks, such as the Internet. For example, a graphical user interface 110 may include a software program executing on a client computer system at one physical location communicating with CAD application 105 at another physical location. Also, in one embodiment, CAD application 105 and graphical user interface 110 may be provided as an application program (or programs) stored on computer readable media such as a CD-ROM, DVD-ROM, flash memory module, or other tangible storage media.

As shown, the system 100 includes, without limitation, CAD application 105, graphical user interface 110, a 3D model 120, user input devices 130, display device 115, and a database 140. CAD application 105 may be configured to allow users interacting with GUI interface 110 to compose a 3D model 120. Accordingly, CAD application 105 and GUI interface 110 may include programmed routines or instructions allowing users to create, edit, load, and save 3D model 120. In one embodiment, the Autodesk® Inventor™ application program (and associated utilities) may be used. Those skilled in the art will recognize, however, that the components shown in FIG. 1 are simplified to highlight aspects of the present invention and that a typical CAD application 105 and GUI interface 110 may include a broad variety of additional tools and features used to compose and manage 3D model 120. Further, although described herein relative to a 3D modeling tool, like the Autodesk® Inventor™ application, one of skill in the art will recognize that the techniques for creating, using, and managing virtual components described herein may be used with both 2D and 3D cad drawings and models.

Illustratively, 3D model 120 includes 3D model parts 122, virtual components 124, and part associations 126. 3D model parts 122 are elements of a mechanical design that are displayed in a 3D model view 112. Virtual components 124 are elements of the mechanical design represented by 3D model 120 that are not displayed in 3D model view 112. Virtual components 124 may; however, be included in displays generated by a model browser tool 114 and in BOMs generated using a BOM tool 116. Part associations 126 enable 3D model parts 122 to be associated with an associative virtual component, as appropriate in a given case. In other words, part associations 126 specify what virtual components 124 are associated with a given 3D model part. Further, virtual components 122 may have properties that describe aspects of the real-world object modeled by the virtual component. For example, properties such as mass and volume may be included in the properties of a virtual component. Such proprieties may be useful for engineering calculations of the expected weight, center of gravity, mass, volume and other physical properties of the real-world object modeled by 3D model 120.

In one embodiment, GUI 110 allows users to create and edit 3D model 120. For example, the Inventor™ application provides a 3D modeling tool used by designers and engineers to produce and perfect new products. As shown, GUI 110 includes 3D model view 112, model browser tool 114, BOM tool 116, and a virtual component definition tool 118. 3D model view 112 presents a graphical representation of 3D model 120 to the user. In one embodiment, 3D model view 112 only displays the 3D model parts 122. In contrast, model browser tool 114 may be configured to present a user with a listing of all parts that are included in 3D model 120, including both 3D model parts 122 and virtual components 124. BOM tool 116 may be configured to generate and display the BOM for the 3D model 120. Virtual component definition tool 118 allows a user to define the properties of a new virtual component 124.

In one embodiment, database 140 stores a parts catalog 145. Parts catalog 145 may include a set of pre-modeled elements that a designer may wish to include in a given design. For example, parts catalog 145 may include a number of pre-modeled construction elements or components of relevant to a particular product such as a collection of available integrated circuits or connectors. Of course, the pre-modeled parts in parts catalog 145 may be tailored to suit the needs of an individual case. The pre-modeled elements in parts catalog 145 may provide a collection of 3D model parts 122, virtual components 124, or both. Importantly, parts catalog 145 is available for use with any 3D model composed using CAD application 105. Thus, parts included parts catalog 145, along with any associated virtual components, can be efficiently reused in multiple mechanical designs.

Figure 2:
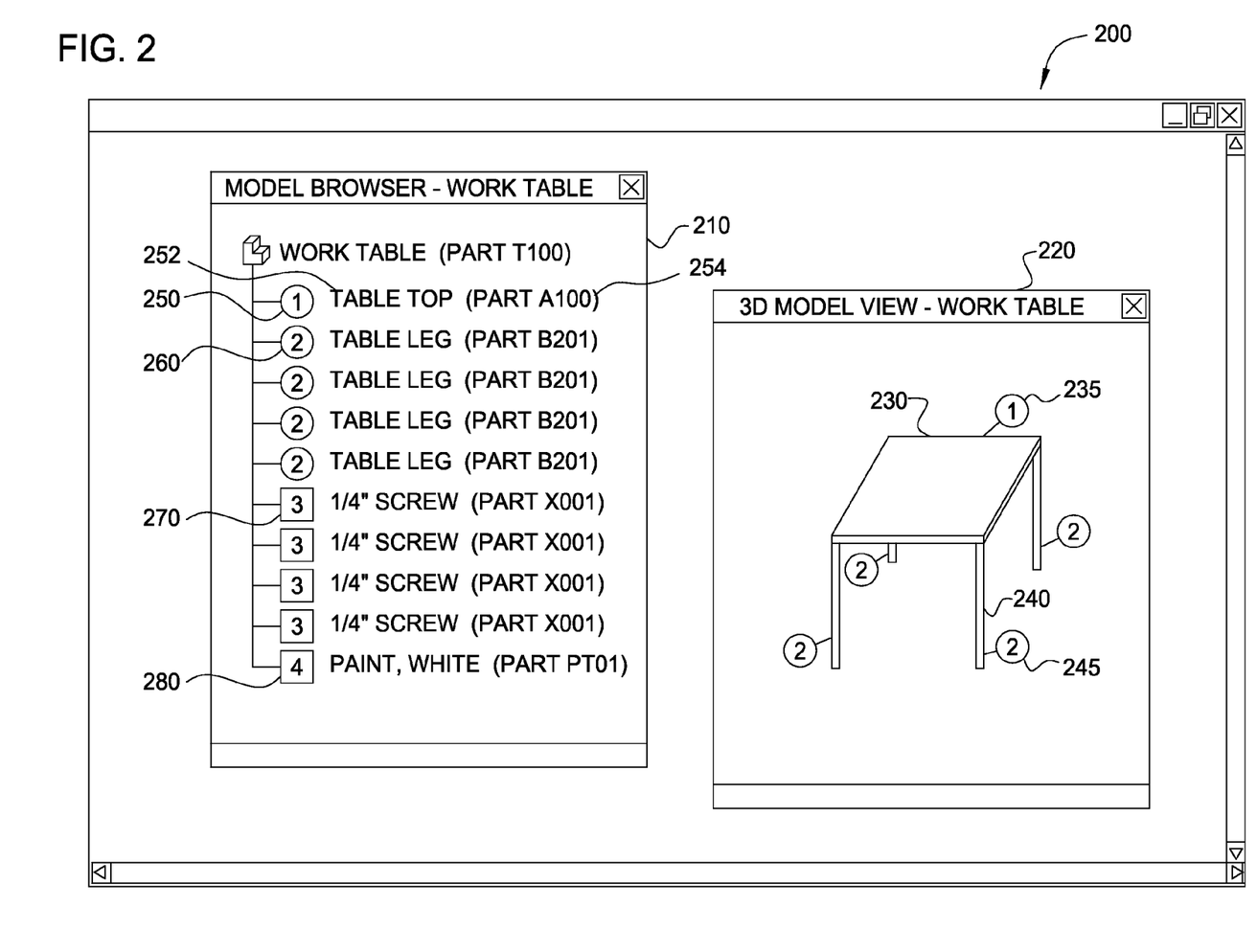
FIG. 2 illustrates a screen display of an exemplary graphical user interface, according to one embodiment of the invention.

FIG. 2 illustrates a screen display 200 displaying an instance of 3D model 120 using both a model browser 210 and a 3D model view 220, according to one embodiment of the invention. In this example, 3D model view 220 displays 3D model 120 that shows a design of a work table. As shown, the work table includes a table top 230 and four table legs 240. 3D model view 220 also displays an icon 235 a circled number "1," linked to the table top 230, and icons 245, each a circled number "2," linked to legs 240.

Screen display 200 also includes model browser 210. In one embodiment, model browser tool 114 may be configured to identify and display the elements present in a given 3D model 120. Unlike the view of the work table in 3D model view 220, the model browser 210 lists both 3D model parts 122 and virtual components 124 included in 3D model 120. Accordingly, in this example, model browser 210 presents a complete list of the parts included in the work table being modeled. The first entry listed in model browser 210 includes part description "Table Top" 252, part number "A100" 254, and icon 250 (a circled number "1"). Icon 250 in model browser 210 corresponds to icon 235 in 3D model view 220, with both icons identifying the table top part 230. Thus, by using the same circled number "1," icons 250 and 235 enable a user to link the graphical representation of table top 230 in the 3D model view 220 to the corresponding element listed in the model browser 210.

Similarly, model browser 210 displays four entries which include icons 260 (the circled number "2"). These four entries correspond to the four table legs 240 in 3D model view 220, where each table leg 240 is labeled with one of icons 245 (the circled number "2.") Again, the use of icons allows the user to link the graphical representation of a part in 3D model view 220 to the textual listing of the same part in model browser 210.

Model browser 210 also displays virtual components 124 included, but not displayed, in the model of the table shown in 3D view 220. For example, model browser 210 contains four entries for a part "¼ inch Screw," having part number "X001." Each of these four entries includes an icon 270 (the number "3" in a square). Also shown is one entry for the part "Paint, White" with a part number of "PT01." This entry includes icon 280 (the number "4" in a square). Illustratively, square icons are used to signify that the corresponding parts are an instance of virtual components 124. For example, the virtual components included in the work table model include the "¼ inch Screw" component, and the "Paint, White" component. By using different icons to distinguish 3D model parts 122 from virtual components 124, a user can quickly identify any virtual components 124 listed in model browser view 210 that are present in a given 3D model 120.

In this example, both the "¼ inch Screw" and the "Paint, White" parts are virtual components 124 in 3D model 120, since both are part of the 3D model, components, but not modeled by a designer as part of the 3D modeling process. Consequently, neither of these parts is displayed in 3D model view 220. Thus, the use of virtual components 124, in accordance with embodiments of the invention, avoids the time and effort of including these parts in the 3D model 120.

Figure 3:
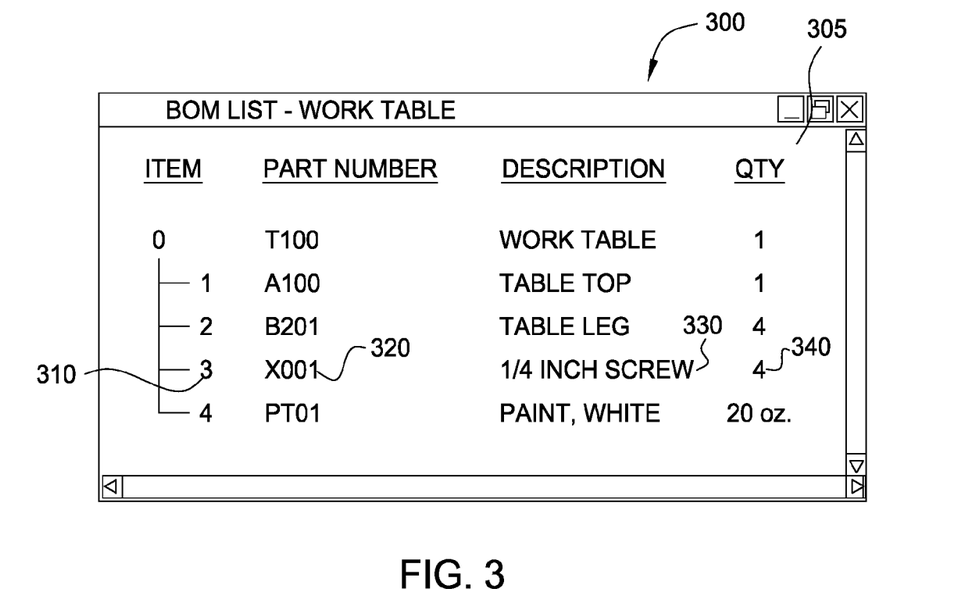
FIG. 3 illustrates a screen display of an exemplary BOM, according to one embodiment of the invention.

Additionally, virtual components 124 are included in a BOM generated by BOM tool 116. FIG. 3 illustrates an example screen display 300 of a BOM, according to one embodiment of the invention. As shown, screen display 300 contains a BOM list 305. In this example, BOM list 305 is generated using the elements of the work table illustrated in FIG. 2. Thus, BOM list 305 contains an entry for each part included in the work table. For example, the fourth line includes an item number 310, a part number 320, a part description 330, and a quantity required 340. That is, entry "3" on BOM list 305 specifies that the work table requires four ¼ inch screws, and that the screws may be identified by a part number of "X001." Importantly, BOM list 305 lists all the parts that are present in 3D model of a work table, including the 3D model parts 122 (items 1, 2) and virtual components (items 3, 4). Thus, the use of virtual components 124, in accordance with embodiments of the invention, allows more accurate BOMS and/or parts lists to be generated from a 3D model, without requiring the designer to manually account for non-modeled elements.

Figure 4:
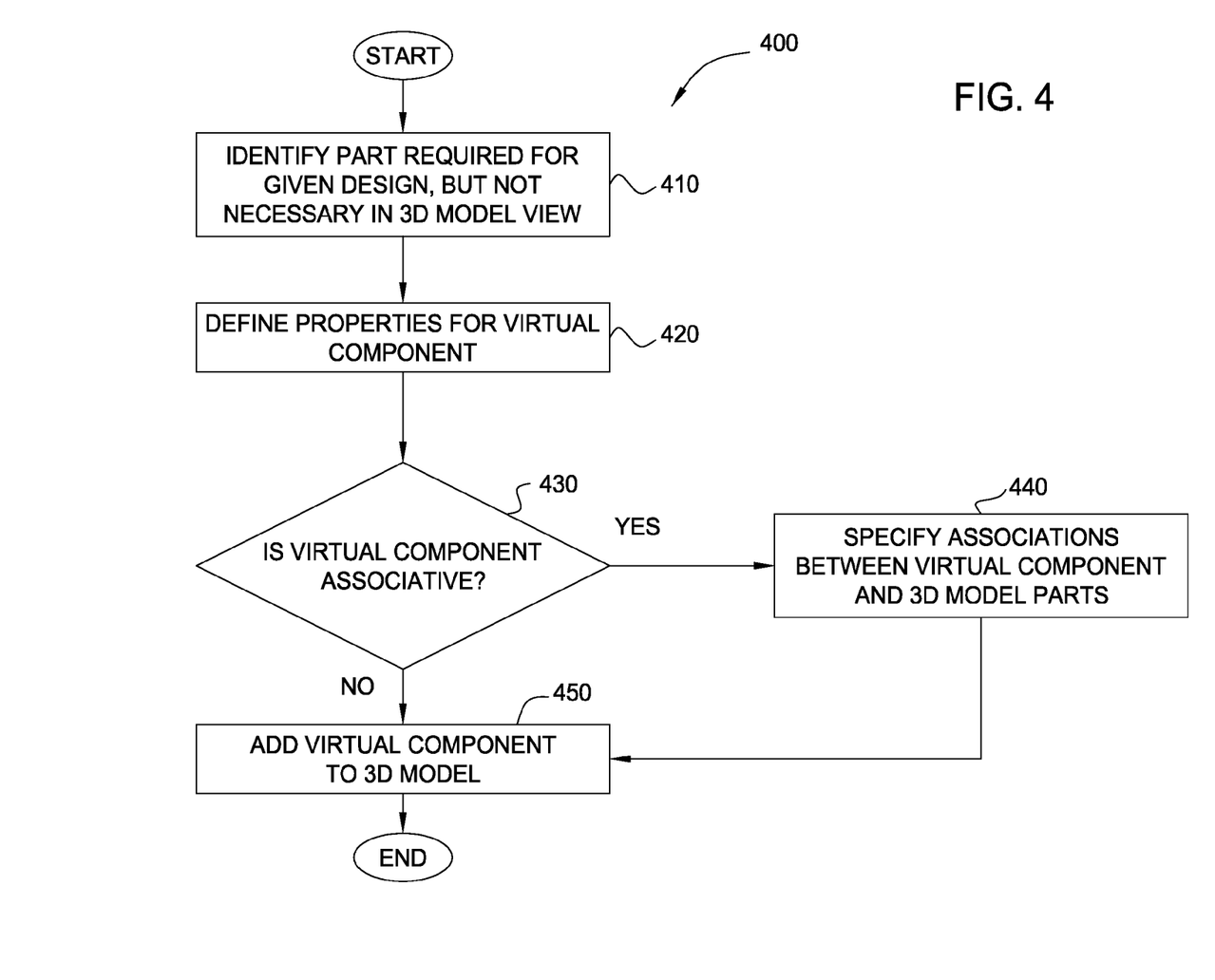
FIG. 4 illustrates a method for adding virtual components to a 3D model, according to one embodiment of the invention

FIG. 4 illustrates a method 400 for adding virtual components 124 to a 3D model, according to one embodiment of the present invention. Persons skilled in the art will understand that any system configured to perform the steps of method 400, in any order, is within the scope of the present invention. As shown, the method 400 begins at step 410, where a part is identified that is required for a given design, but is not necessary in a 3D rendering of that design. At step 420, the properties of the virtual component are defined. For example, the display name, cost, or supplier of a virtual component may be defined. Of course, the particular collection of properties for a virtual component may be tailored to suit the needs of an individual case. At step 430, the virtual component may be associated with one or more 3D model parts 122. That is, the virtual component may be defined as an associative virtual component. If so, at step 440, part associations 126 between 3D model parts 122 and the virtual component 124 are specified. At step 450, the newly specified virtual component is added to virtual components 124 of 3D model 120.

Figure 5:
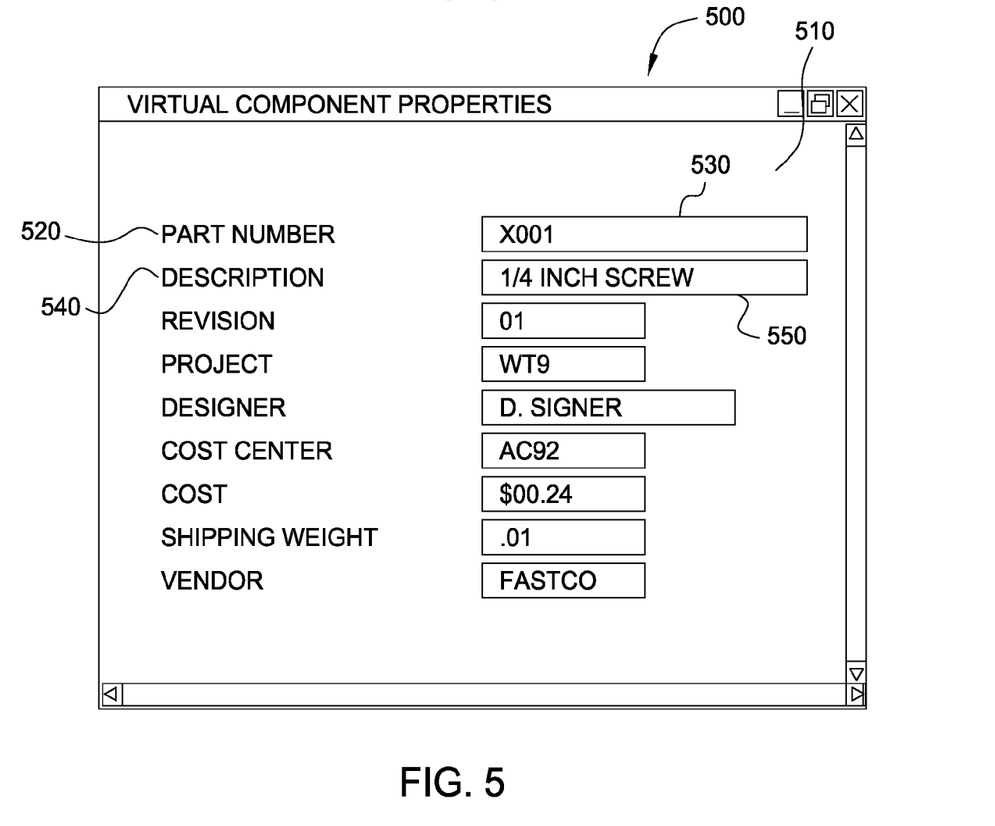
FIG. 5 illustrates an exemplary dialog box for specifying the properties of a virtual component, according to one embodiment of the invention.

FIG. 5 illustrates a dialog box 500 for specifying the properties of a virtual component, according to one embodiment of the invention. Dialog box 500 presents an example of a graphical interface for specifying the properties of a virtual component. As shown, the virtual component properties definition screen 510 lists the name of each property and a text field for entry of the value of that property on a separate line. For example, the property "PART NUMBER" 520 is next to text field 530, which contains the value "X001." Also, the property "DESCRIPTION" 540 is next to text field 550, which contains the value "¼ inch Screw." In one embodiment, model browser tool 114 may use this data to create a view of the virtual component. For example, FIG. 2 shows model browser 210, which displays four lines for item "3" (having icon 270), where each line has the description of "¼ inch Screw," and a part number of "X001." Similarly, as shown in FIG. 3, the BOM includes a line for item number "3" 310, with part number "X001" 320 and description "¼ inch Screw" 330. The property values specified in associative virtual component properties definition screen 510 are stored in virtual components 124 of 3D model 120 and are utilized in the generation of GUI 110, including model browser 210 and BOM list 305.

Figure 6A:
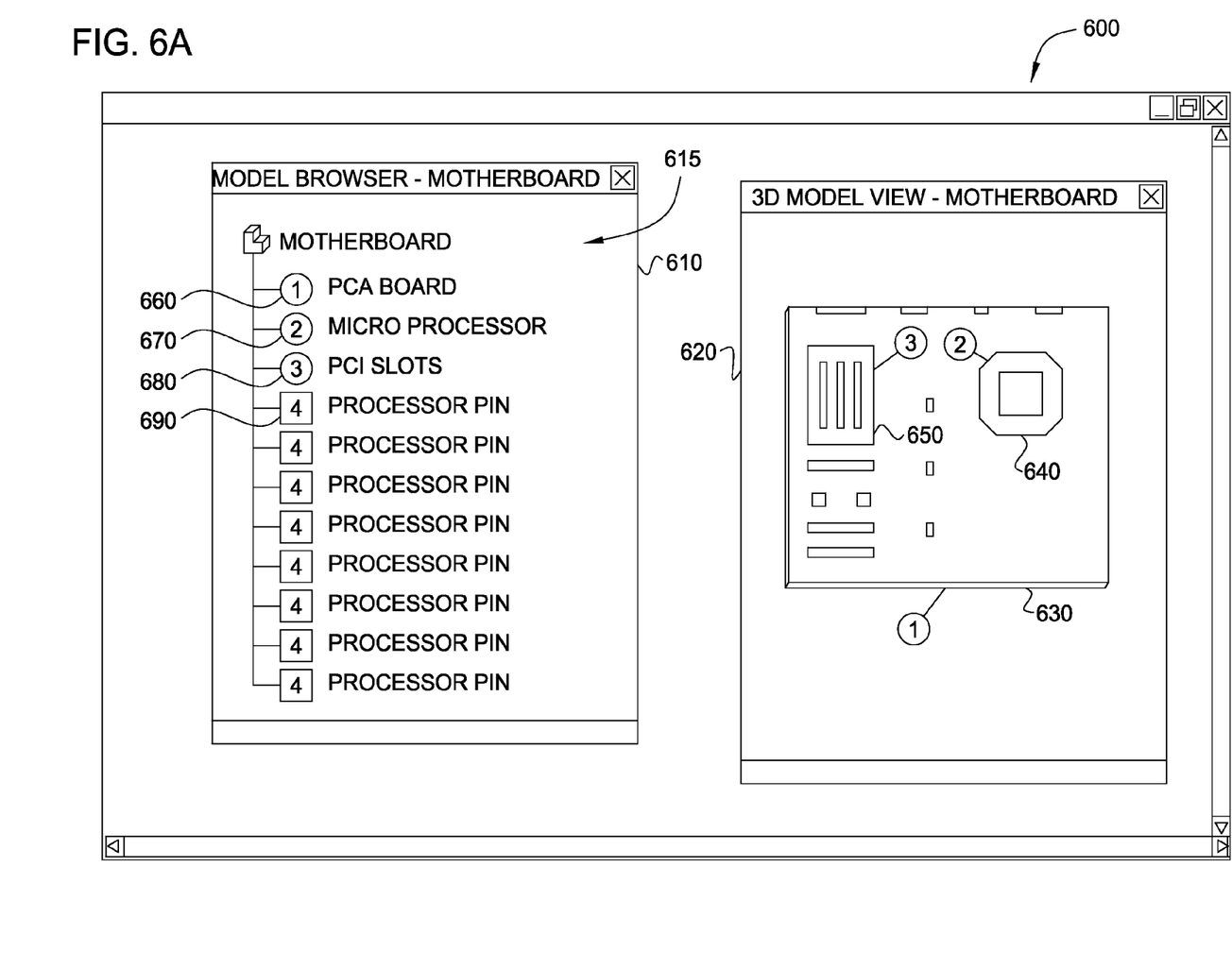
FIGS. 6A-B illustrate a screen display of an exemplary graphical user interface showing the use of associative virtual components, according to one embodiment of the invention.
Figure 6B:
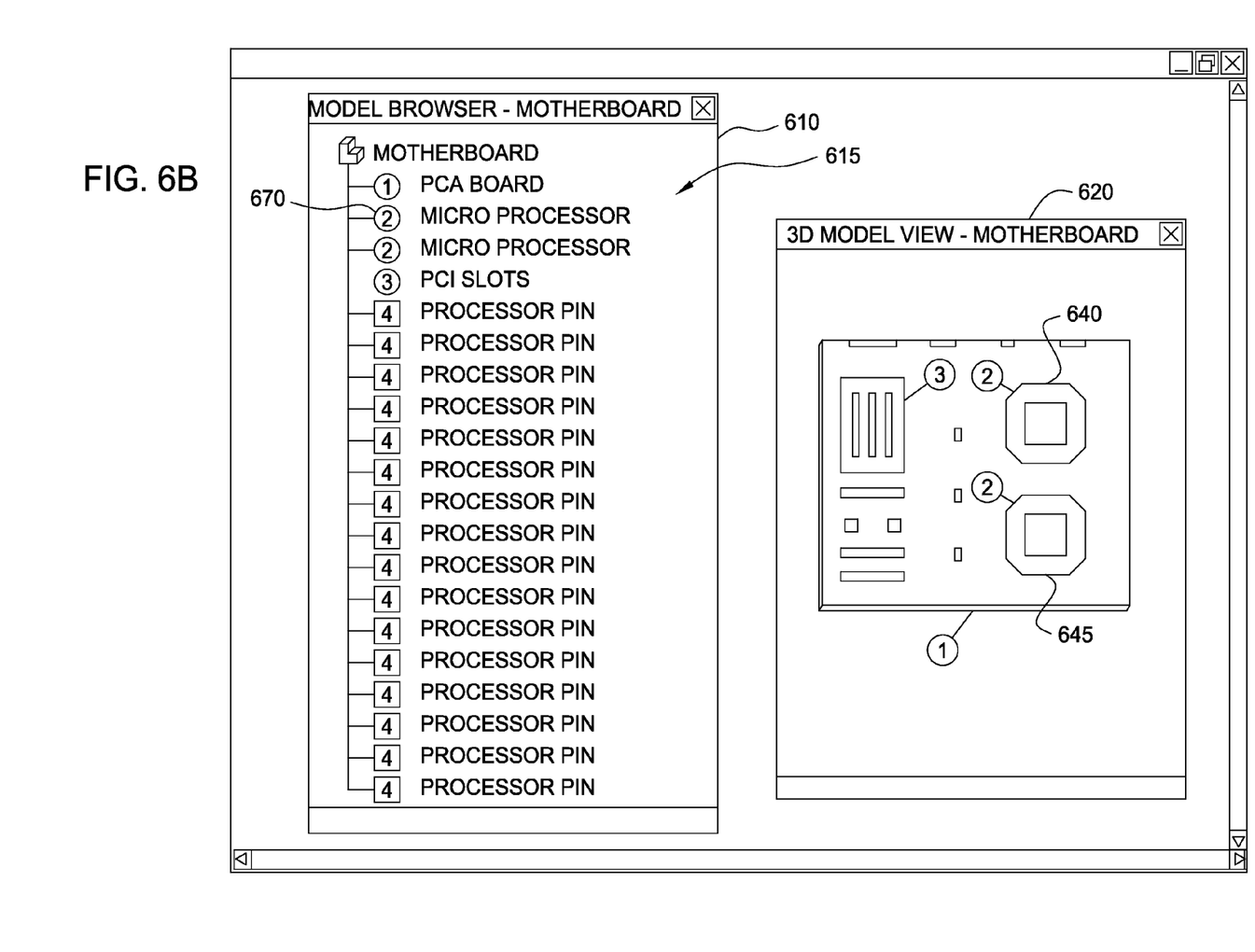

As stated, in one embodiment, virtual components 124 may be associative virtual components. Associative virtual components are virtual components 124 that also have part associations 126 defined in 3D model. FIGS. 6A and 6B illustrate a screen display of an exemplary graphical user interface showing the use of associative virtual components, according to one embodiment of the invention. Like the screen display 200 illustrated in FIG. 2, screen display 600 in FIG. 6A includes a model browser 610 provided by model browser tool 114 and a 3D model view 620 provided by 3D model view 112. As shown in FIG. 6A, model browser 610 displays a list 615 of the parts included in a 3D model 120 representing an integrated circuit board. As in the previous example, icons 660, 670, 680 and 690 allow a user to identify the same parts in both the model browser 610 and in 3D model view 620. Importantly, the parts having icons 690 (the number "4" in a square) are present in model browser 610, but are not displayed in 3D model view 620. Thus, the parts having icon 690 and having description "PROCESSOR PIN" are virtual components 124 in this particular 3D model.

In this example, the processor pins (having icon 690) are associative virtual components which are associated to the microprocessor 640. The processor pins are used to mount a first model part representing microprocessor 640 to a second model part representing a PCA board 650. Microprocessor 630 has four sides, and requires two processor pins per side, for a total requirement of eight processor pins per microprocessor. Consequently, the parts list 615 of model browser 610 includes eight entries with icon 690 and description "PROCESSOR PIN," signifying that eight processor pins are required in this 3D model.

As illustrated in FIG. 6B, associative virtual components are useful in situations where parts in 3D model are used multiple times. FIG. 6B illustrates the screen display 600 of FIG. 6A after a user has changed this 3D model. As shown in 3D model view 620, microprocessor 640 has been duplicated, resulting in a second microprocessor 645 in this 3D model. Consequently, model browser 610 displays an updated list 615 of parts that make up the 3D model of an integrated circuit board. Importantly, the item having icon 670 and a description of "MICRO PROCESSOR" is now listed twice. Further, the entry with an icon 690 and a description of "PROCESSOR PIN" is now listed sixteen times. Thus, since the processor pins are associative virtual components that are associated to the microprocessor, the quantity of processor pins 690 in this 3D model automatically changes in proportion to the number of microprocessors. This automatic adjustment of the quantity of virtual components required saves time and effort in the construction of this 3D model.

Figure 7:
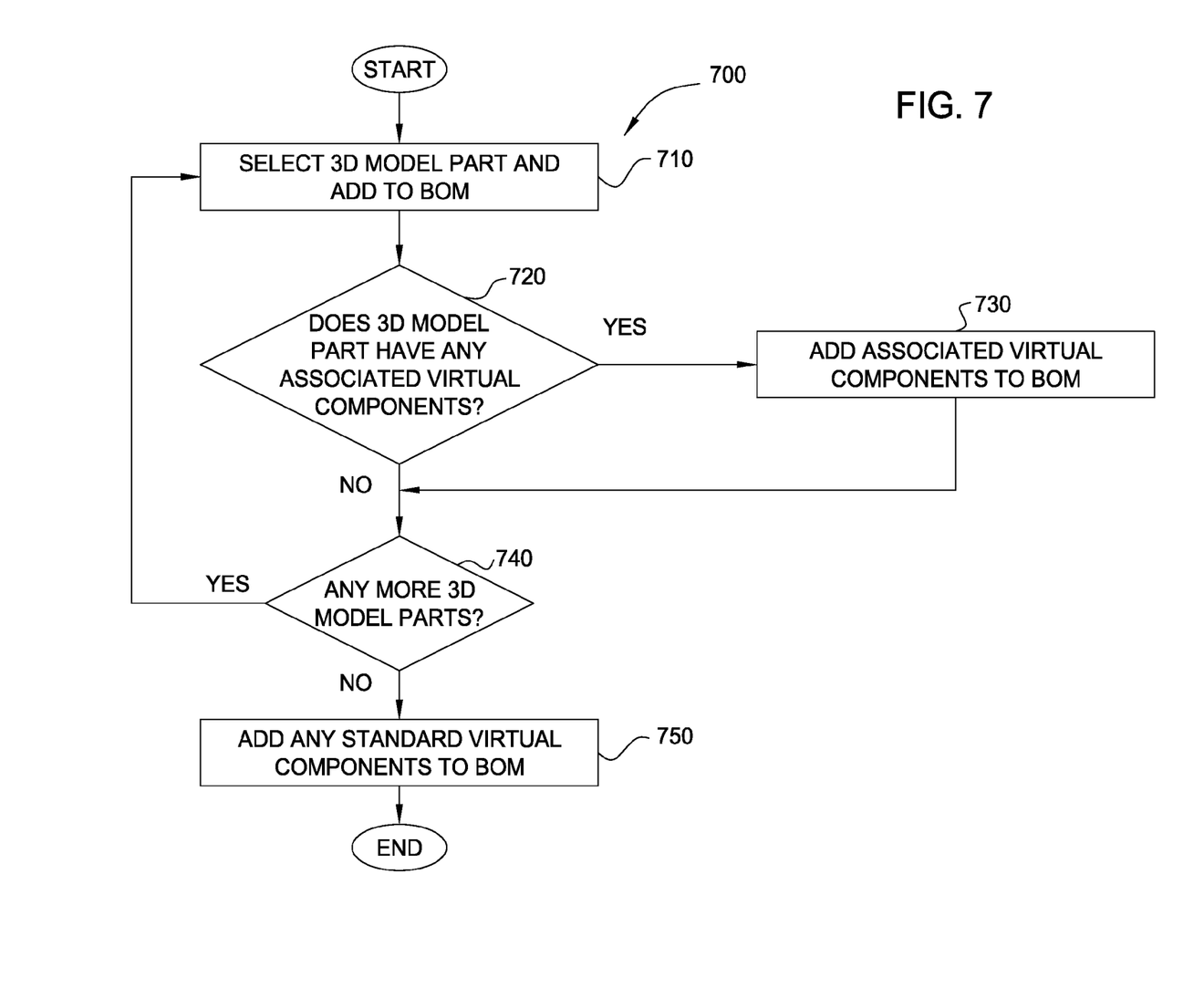
FIG. 7 illustrates a method for generating a BOM from a 3D model that includes virtual components, according to one embodiment of the invention.

FIG. 7 illustrates a method 700 for generating a BOM from 3D model that includes virtual components, according to one embodiment of the invention. Persons skilled in the art will understand that any system configured to perform the method 700, in any order, is within the scope of the invention. The method 700 begins at step 710, where a 3D model part from the 3D model is selected and added to the BOM. At step 720, a determination is made of whether the 3D model part has any associated virtual components. If so, the method 700 continues at step 730, where the associated virtual components are added to the BOM. At step 740, a determination is made of whether there are any more 3D model parts in the 3D model. If so, the method 700 returns to step 710. Once all 3D model parts have been added to the BOM, the method 700 continues at step 750, where the standard virtual components (i.e., not associative virtual components) that are part of the 3D model are also added to the BOM.

Advantageously, the use of virtual components simplifies the appearance of 3D models generated from a CAD drawing, while simultaneously allowing the 3D model to be used to generate an accurate BOM or parts list. By defining a 3D modeling element as a virtual component that element may be included in the 3D model, but not shown in 3D representations generated of that model. Further, an associative virtual component may be associated with one or more 3D modeling elements that are shown in 3D representation of the model. When such a 3D modeling element is included in the 3D model, any associative virtual components associated with that 3D modeling elements are automatically included in the model. Thus, virtual components may simply the modeling process, while at the same time, the 3D model more accurately portrays an object or mechanical design being modeled.

While the forgoing is directed to embodiments of the present invention, other and further embodiments of the invention may be devised without departing from the basic scope thereof, and the scope thereof is determined by the claims that follow.

What is claimed is:

1. A method for generating a computer-aided design (CAD) drawing comprising:
   receiving a selection of a non-modeled component, the non-modeled component defining an element of a model in the CAD drawing, wherein the non modeled component does not include a display representation;
   adding, by operation of one or more computer processors, one or more instances of the non-modeled component to the model; and
   generating a browse view display of the model, wherein the browse view display includes a list of instances of modeled and non-modeled components of the model, and wherein the browse view display indicates which instances in the list correspond to the one or more instances of the non-modeled component.

2. The method of claim 1, wherein a first display representation of the model is a three-dimensional (3D) representation.

3. The method of claim 1, further comprising generating a bill of materials from the CAD drawing, wherein the bill of materials identifies the modeled components and the non-modeled components included in the CAD drawing.

4. The method of claim 3, wherein the bill of materials identifies parts, sub-assemblies and raw materials required to build a real-world object represented by the model.

5. The method of claim 1, wherein the non-modeled component is associated with a modeled element which includes a display representation, and wherein an instance of the non-modeled component is added to the model whenever an instance of the modeled element is added to the model.

6. The method of claim 1, further comprising providing a catalog of pre-modeled components, wherein the catalog includes at least one non-modeled component.

7. The method of claim 1, wherein the non-modeled component includes one or more attributes describing physical characteristics of a real-world object represented by the non-modeled component.

8. A non-transitory computer-readable medium storing instructions for generating a computer-aided design (CAD) drawing, including instructions for performing the steps of:
   receiving a selection of a non-modeled component, the non-modeled component defining an element of a model in the CAD drawing, wherein the non modeled component does not include a display representation;
   adding, by operation of one or more computer processors, one or more instances of the non-modeled component to the model; and
   generating a browse view display of the model, wherein the browse view display includes a list of instances of modeled and non-modeled components of the model, and wherein the browse view display indicates which instances in the list correspond to the one or more instances of the non-modeled component.

9. The computer-readable medium of claim 8, wherein a first display representation of the model is a three-dimensional (3D) representation.

10. The computer-readable medium of claim 8, wherein the instructions further include instructions for generating a bill of materials from the CAD drawing, wherein the bill of materials includes modeled components and non-modeled components included in the CAD drawing.

11. The computer-readable medium of claim 10, wherein the bill of materials identifies parts, sub-assemblies and raw materials required to build a real-world object represented by the model.

12. The computer-readable medium of claim 8, wherein the non-modeled component is associated with a modeled element which includes a display representation, and wherein an instance of the non-modeled component is added to the model whenever an instance of the modeled element is added to the model.

13. The computer-readable medium of claim 8, wherein the instructions further include instructions for providing a catalog of pre-modeled components, wherein the catalog includes at least one non-modeled component.

14. The computer-readable medium of claim 8, wherein the non-modeled component includes one or more attributes describing physical characteristics of a real-world object represented by the non-modeled component.

15. A method for composing a computer-aided design (CAD) drawing comprising:
  selecting a non-modeled component, the non-modeled component defining an element of a model in the CAD drawing, wherein the non modeled component does not include a display representation and
  invoking a tool configured to:
    add, by operation of one or more computer processors, one or more instances of the non-modeled component to the model, and
    generate a browse view display of the model, wherein the browse view display includes a list of instances of modeled and non-modeled components of the model, and wherein the browse view display indicates which instances in the list correspond to the one or more instances of the non-modeled component.

16. The method of claim 15, wherein a first display representation of the object is a three-dimensional (3D) representation.

17. The method of claim 15, further comprising invoking a bill of materials tool configured to generate a bill of materials from the CAD drawing, wherein the bill of materials identifies the modeled components and the non-modeled components included in the CAD drawing.

18. The method of claim 17, wherein the bill of materials identifies parts, sub-assemblies and raw materials required to build a real-world object represented by the model.

19. The method of claim 15, wherein the non-modeled component is associated with a modeled element which includes a display representation, and wherein an instance of the non-modeled component is added to the model whenever an instance of the modeled element is added to the model.

20. The method of claim 15, further comprising selecting a component to include in the CAD drawing from a catalog of pre-modeled components, wherein the catalog includes at least one non-modeled component.

* * * * *